(12) United States Patent
Wintrich et al.

(10) Patent No.: US 9,180,622 B2
(45) Date of Patent: Nov. 10, 2015

(54) METHOD AND DEVICE FOR THE TRANSVERSE DRAWING OF A MATERIAL WEB

(75) Inventors: Leo Wintrich, Oberwürzbach (DE); Robert Hansohn, Kirkel (DE)

(73) Assignee: Treofan Germany GmbH & Co. KG (DE)

( * ) Notice: Subject to any disclaimer, the term of this patent is extended or adjusted under 35 U.S.C. 154(b) by 618 days.

(21) Appl. No.: 11/912,360

(22) PCT Filed: May 9, 2006

(86) PCT No.: PCT/EP2006/004313
§ 371 (c)(1),
(2), (4) Date: Oct. 23, 2007

(87) PCT Pub. No.: WO2006/119959
PCT Pub. Date: Nov. 16, 2006

(65) Prior Publication Data
US 2008/0157423 A1 Jul. 3, 2008

(30) Foreign Application Priority Data
May 10, 2005 (DE) .......................... 10 2005 021 471

(51) Int. Cl.
*B29C 55/08* (2006.01)
*B29C 35/02* (2006.01)

(52) U.S. Cl.
CPC *B29C 55/08* (2013.01); *B29C 35/02* (2013.01)

(58) Field of Classification Search
CPC .................................................. B29K 2067/00
USPC ..................................................... 264/290.2
See application file for complete search history.

(56) References Cited

U.S. PATENT DOCUMENTS 2,412,157 A * 12/1946 Kronquest ................. 192/56.57
2,412,187 A   12/1946 Wiley et al.
(Continued)

FOREIGN PATENT DOCUMENTS

DE    2356743 A1    5/1975
JP    55034937      3/1980
(Continued)

OTHER PUBLICATIONS

Breil, "Added Value Speciality Films Produced with Sequential and Simultaneous Stretching Lines", Specialty Plastic Films 2002, 18th Annual World Congress, Maack Business Services, Session 2/2, pp. 1-32, 2002.

*Primary Examiner* — Joseph S Del Sole
*Assistant Examiner* — John Robitaille
(74) *Attorney, Agent, or Firm* — Drinker Biddle & Reath LLP

(57) ABSTRACT

The invention relates to a method for the transverse drawing of an unoriented or longitudinally-oriented film web made from thermoplastic plastic. According to said method, an undrawn or longitudinally-drawn film (8) is introduced into a transverse drawing frame in which heater fields (1) are heated to a transverse drawing temperature $T_Q$, in the attached drawing fields (2) a clip chain is drawn in the transverse direction by divergent (V-shaped) guides and a temperature $T_F$ is applied to fixing fields where $T_Q > T_F$. In the drawing fields and/or the heating fields (1) the boundary zones (5) of the film (8) are heated or thermally insulated such that the boundary zones (5) of the film (8) have a higher temperature than the middle of the film web (6) on transverse drawing and/or fixing.

24 Claims, 12 Drawing Sheets

(56) References Cited

U.S. PATENT DOCUMENTS

Figure 1:
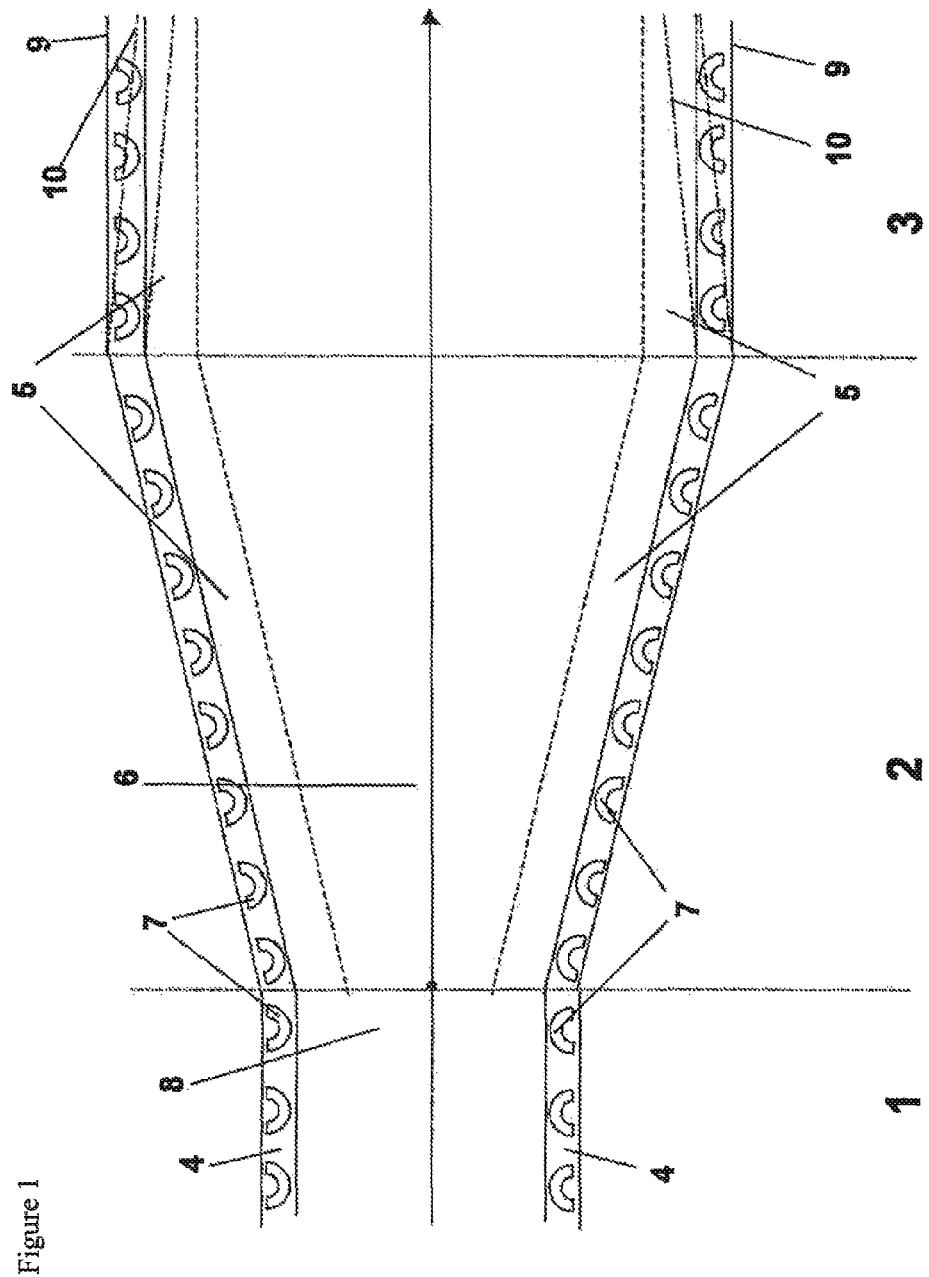

| | | | |
|---|---|---|---|
| 2,851,733 A * | 9/1958 | Simril et al. | 264/235.8 |
| 5,753,172 A * | 5/1998 | Forrest et al. | 264/481 |
| 6,372,174 B1 * | 4/2002 | Breil et al. | 264/408 |
| 2003/0148131 A1 * | 8/2003 | Tsunekawa et al. | 428/482 |
| 2005/0271877 A1 * | 12/2005 | Ginossatis | 428/411.1 |

FOREIGN PATENT DOCUMENTS

| | | |
|---|---|---|
| JP | 2002361733 | 12/2002 |
| WO | 98/25754 A1 | 6/1998 |

\* cited by examiner

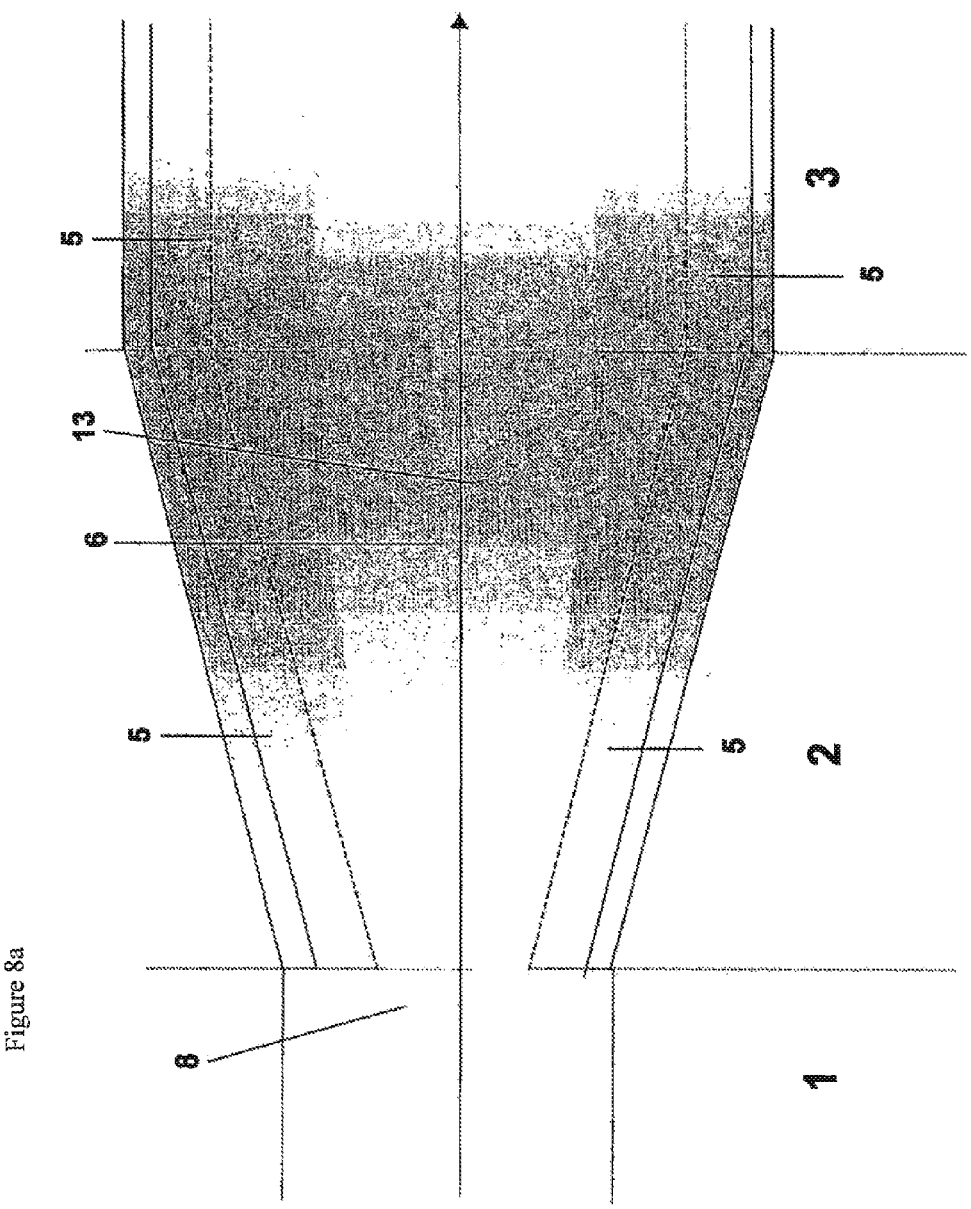

METHOD AND DEVICE FOR THE TRANSVERSE DRAWING OF A MATERIAL WEB

RELATED APPLICATIONS

This application is a national stage application (under 35 U.S.C. 371) of PCT/EP2006/004313 filed May 9, 2006, which claims benefit of German application 10 2005 021 471.1 filed May 10, 2005.

The present invention relates to a method and a device for drawing a material web in a transverse direction.

Biaxially oriented films are known in the state of the art and are used in many different applications. In particular, biaxially oriented polypropylene films, which shrink to a greater or less extent in one or other direction at increased temperatures, have been developed in recent years. The shrinkage characteristics depend on the composition of the individual layers and on the conditions during the manufacture of the film. In particular, the temperatures during drawing, the draw factors and the subsequent fixing are decisive. The shrinkage characteristics of a biaxially oriented film can be varied within a wide range by varying these conditions.

For some applications, it is particularly desirable that films have a high shrinkage in only one direction, while at the same time the shrinkage in the other directions should be as low as possible. For other applications, films are preferred, which have a shrinkage in both directions. Shrink films of this kind can be made from widely differing thermoplastic polymers, for example polyolefin, such as polypropylene or polyethylene, or from aromatic or aliphatic polyesters etc.

The manufacture of such shrink films from polypropylene is basically implemented in practice without major difficulties. According to the usual manufacturing methods, (flat film method), the polymers of the individual layers are first melted in an extruder and the melts extruded through a flat nozzle. The formed molten film is cooled on a take-off roll, solidified and subsequently biaxially drawn. Drawing in the longitudinal direction is generally carried out first by means of rollers running at different speeds. Orientation is then carried out in the transverse direction in a so-called transverse drawing frame (Stenter frame), and finally the fixing. This biaxial drawing guarantees important usage properties such as mechanical strength, stiffness, transparency, uniform thickness profile etc.

In this manufacturing process, it is essential that certain temperatures are maintained when cooling the preliminary film and when drawing longitudinally as well as when drawing transversely and fixing. For this reason, devices for heating and cooling are provided in every system, by means of which the film can be heated and cooled to the appropriate temperature as uniformly as possible. Before longitudinal drawing, the film is heated, using heated rollers for example, but a hot air box enclosing the film is also possible. After longitudinal drawing, the film is cooled once more. This is followed by reheating to the required transverse drawing temperature. The film, which has been heated in this way, is then fed into so-called drawing fields and made continuously wider by means of divergent guiding of the clip chain in the direction of travel of the film. In order to achieve as uniform a stretching of the film as possible, a constant temperature is maintained across the width of the film web. As it passes through the drawing fields, the temperature in the direction of travel of the film can vary; in general, the later drawing fields are somewhat cooler than the infeed area (negative temperature gradient). This temperature control is favourable for the thickness profile of the film. To maintain these temperatures during transverse drawing, this part of the film manufacturing system is enclosed with insulation.

It has been shown that it is also basically possible to manufacture a film from polypropylene with the required shrinkage characteristics using this method. Within the framework of the investigations into the present application, it was established that the transverse shrinkage values are not constant over the width of the film and these deviations lead to problems in certain applications. Frequently, the transverse shrinkage values towards the edges are higher than in the middle of the film. This uneven distribution of the shrinkage over the width of the film (transverse shrinkage profile or bathtub profile) therefore needs to be improved.

It was therefore the object of the present invention to provide a method according to which a biaxially oriented film can be manufactured, which has a transverse shrinkage, which is as uniform as possible over the width of the film at increased temperature. It must be possible to employ the method easily, economically efficiently and for different film materials, in particular for biaxially drawn polypropylene films. The method must also be flexibly suitable for other starting materials and different running speeds. Any fixtures required must need little maintenance and have low susceptibility to repairs.

Surprisingly, this object is achieved by a method for the transverse drawing of an unoriented or longitudinally oriented film web (8) made from thermoplastic plastic, in which an undrawn or longitudinally drawn film (8) is introduced into a transverse drawing frame, wherein the transverse drawing frame includes heater fields (1), drawing fields (2) and fixing fields (3), and the film (8) is gripped at the beginning of the first heater field on both edges (4) by the clips (7) of a clip chain and heated in the heater fields (1) (1) to a transverse drawing temperature $T_Q$, and the film (8) is drawn in the subsequent drawing fields (2) by divergent (V-shaped) guiding of the clip chain in the transverse direction and subjected to a temperature $T_F$ in the fixing fields (3) where $T_Q > T_F$, and wherein the boundary zones (5) of the film are heated or thermally insulated in the drawing fields (2) and/or in the fixing fields (3) in such a way that the boundary zones (5) of the film have a higher temperature than the middle of the film web (6) on transverse drawing and/or fixing.

In the sense of the present invention, the longitudinal direction is the direction in which the material web runs during manufacture; this direction is also referred to as the machine running direction. In the sense of the present invention, the transverse direction is that direction, which runs at an angle of 90°, i.e. perpendicular, to the machine running direction.

FIG. 1 shows a schematic plan view of the drawing of a film in a transverse drawing frame. The transverse drawing frame includes three zones, the heater field 1, the drawing field 2 and the fixing field 3. In professional circles, the terms heater fields, drawing fields and fixing fields are also used to indicate that the particular heater, drawing and fixing field includes several areas or zones. When the film edges 4 enter the heater field 1, they are gripped and guided by the clips 7. The boundary zones 5 of the film are immediately adjacent to the film edges 4. The middle of the film is the area 6. When the film 8 passes through the heater field 1, it is heated to a temperature $T_Q$. In the subsequent drawing field 2, the film 8 is drawn in the transverse direction by divergent guiding of the clip chain. After transverse drawing, the film 8 leaves the drawing field 2 and enters the fixing zone 3 in which the film 8 is transported with constant width according to Number 9 or slightly converging, i.e. with reducing width, according to Number 10.

Figure 2:
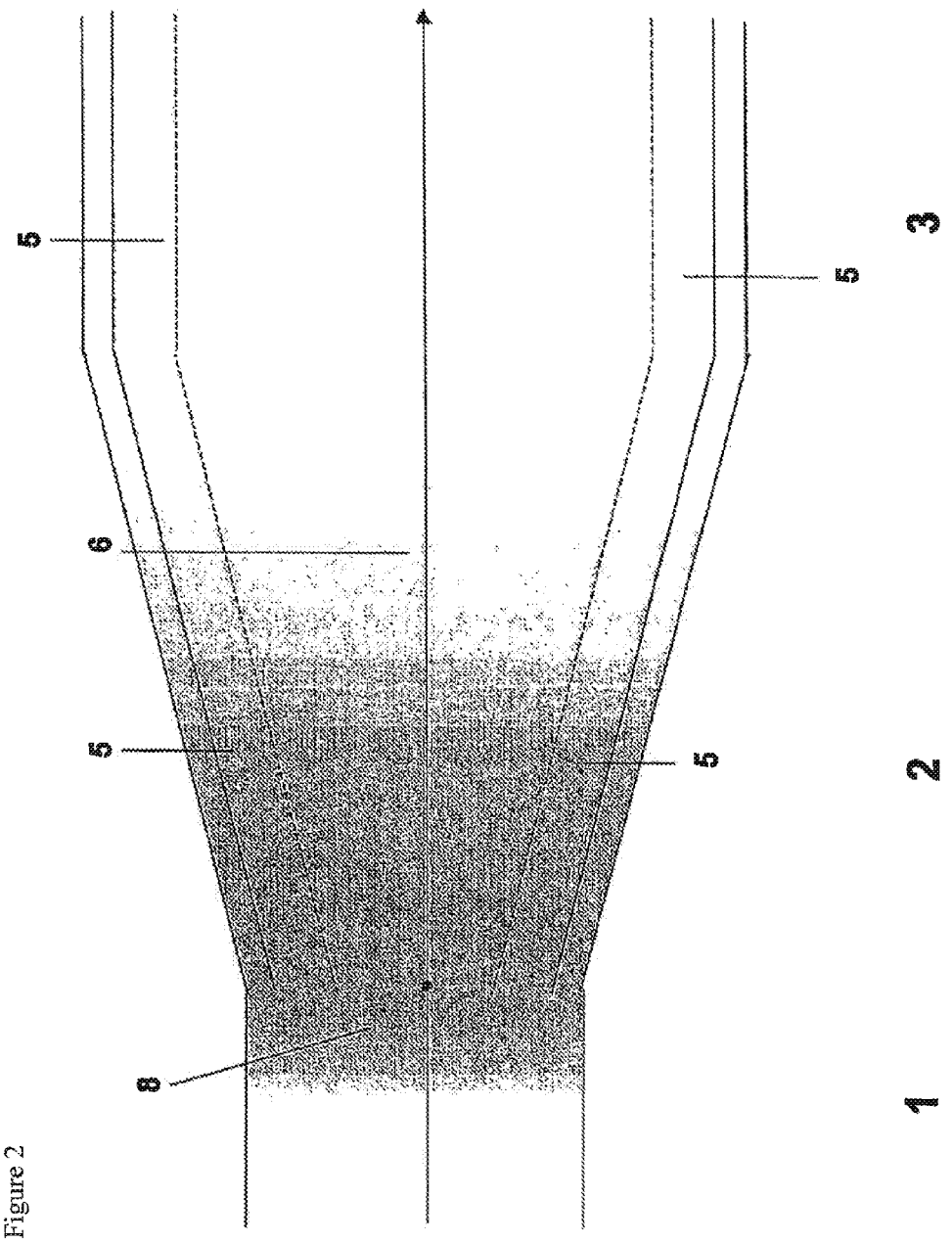

FIG. 2 shows a preferred temperature profile for transverse drawing according to the state of the art (negative temperature gradient). The darker the area, the higher the prevailing temperature or the temperature of the film 8 at that point. In the heater fields 1, the film 8 is heated to a temperature $T_O$ with which it enters the drawing field 2. Tempering is carried out on passing through the drawing fields 2 in such a way that the film temperature continually reduces. However, the film 8 has the same temperature across the width of the film web at every position in the drawing field 2. The film is cooled as it passes through the fixing fields 3, as a result of which the temperature also continues to reduce in this zone 3 in the direction of travel.

Figure 3:
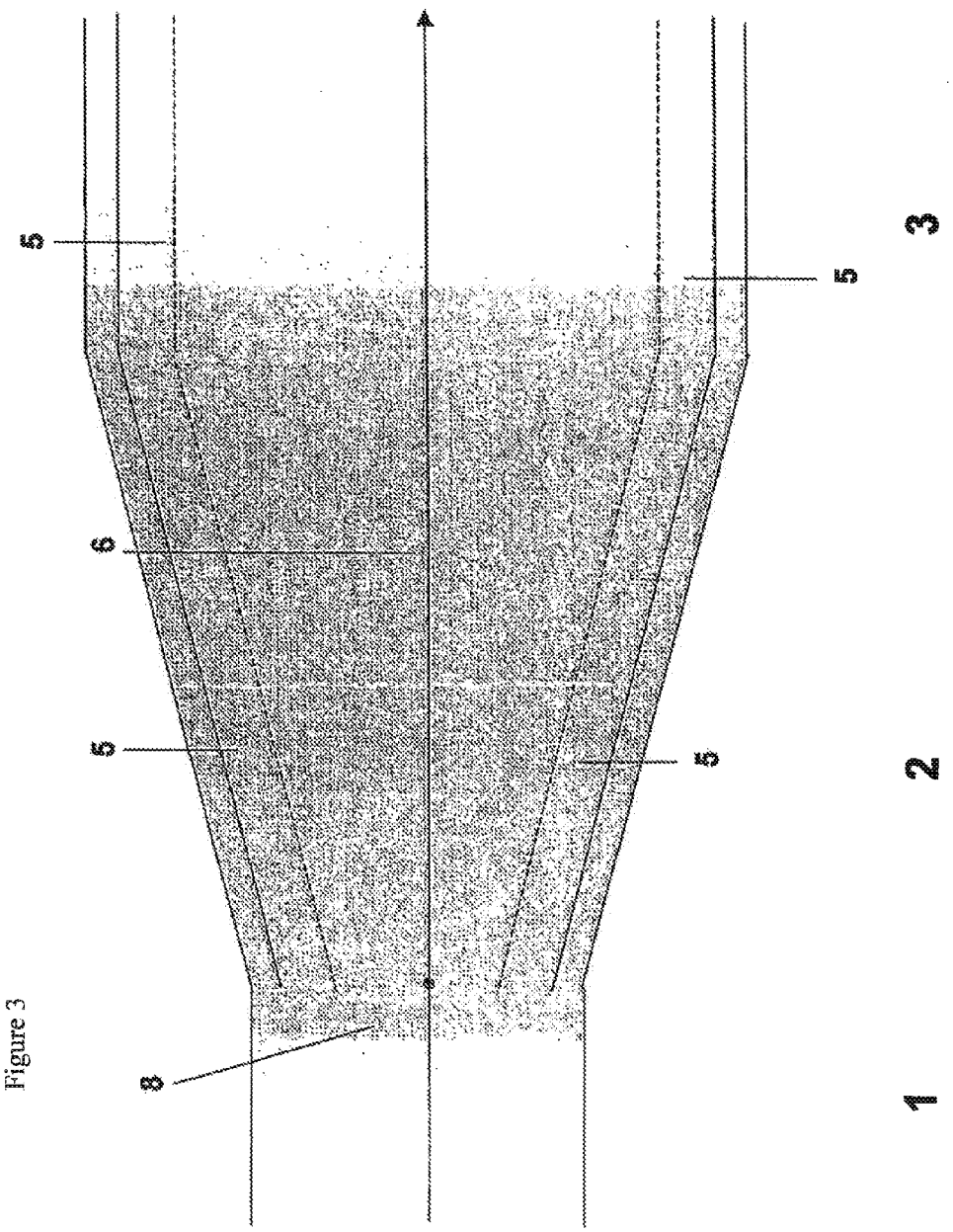

FIG. 3 shows an alternative temperature control in the drawing fields 2 (isothermal temperature control). Here, the film 8 is tempered as it passes through the drawing fields 2 so that the film 8 has approximately the same temperature in all drawing fields. It is then cooled as usual in the fixing zone 3.

Figure 4:
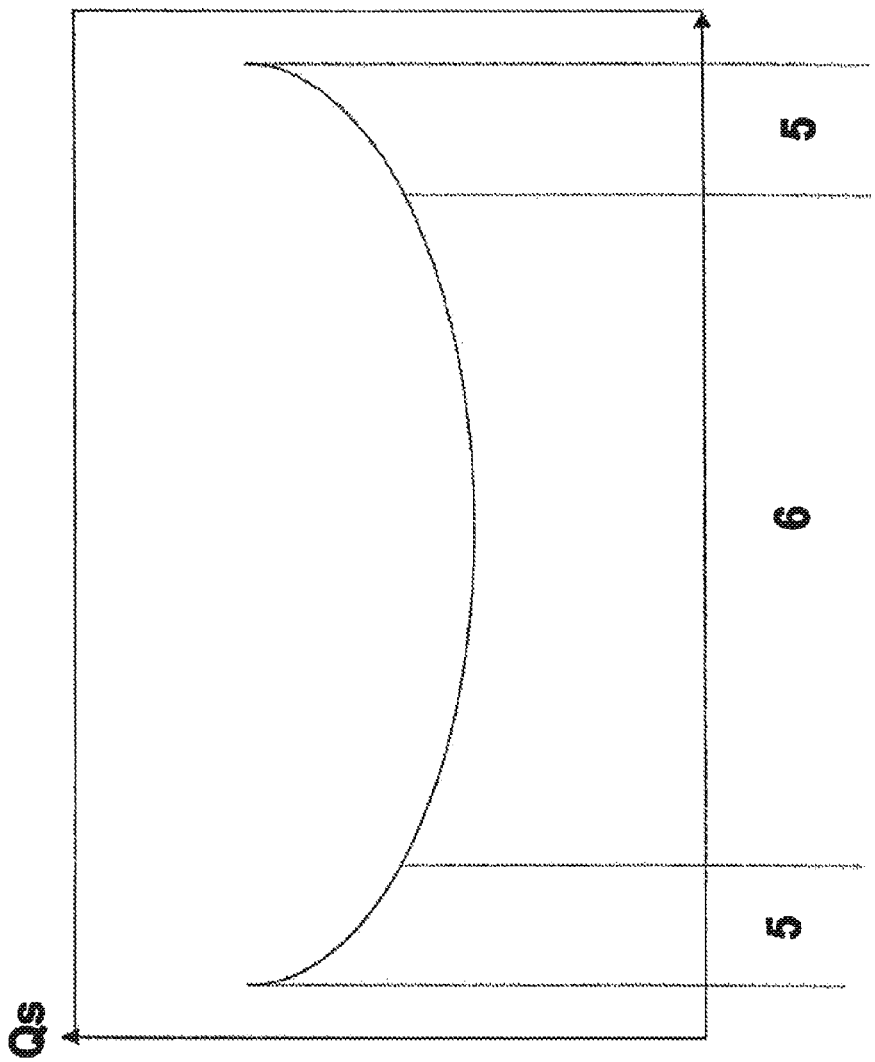

FIG. 4 shows schematically the transverse shrinkage Qs over the width of the film, which results when the film is manufactured according to the state of the art (bathtub profile). The transverse shrinkage is lowest in the area of the middle of the film 6 and increases towards the boundary zones 5. The undrawn edges 4 have already been trimmed in this diagram.

Figure 5:
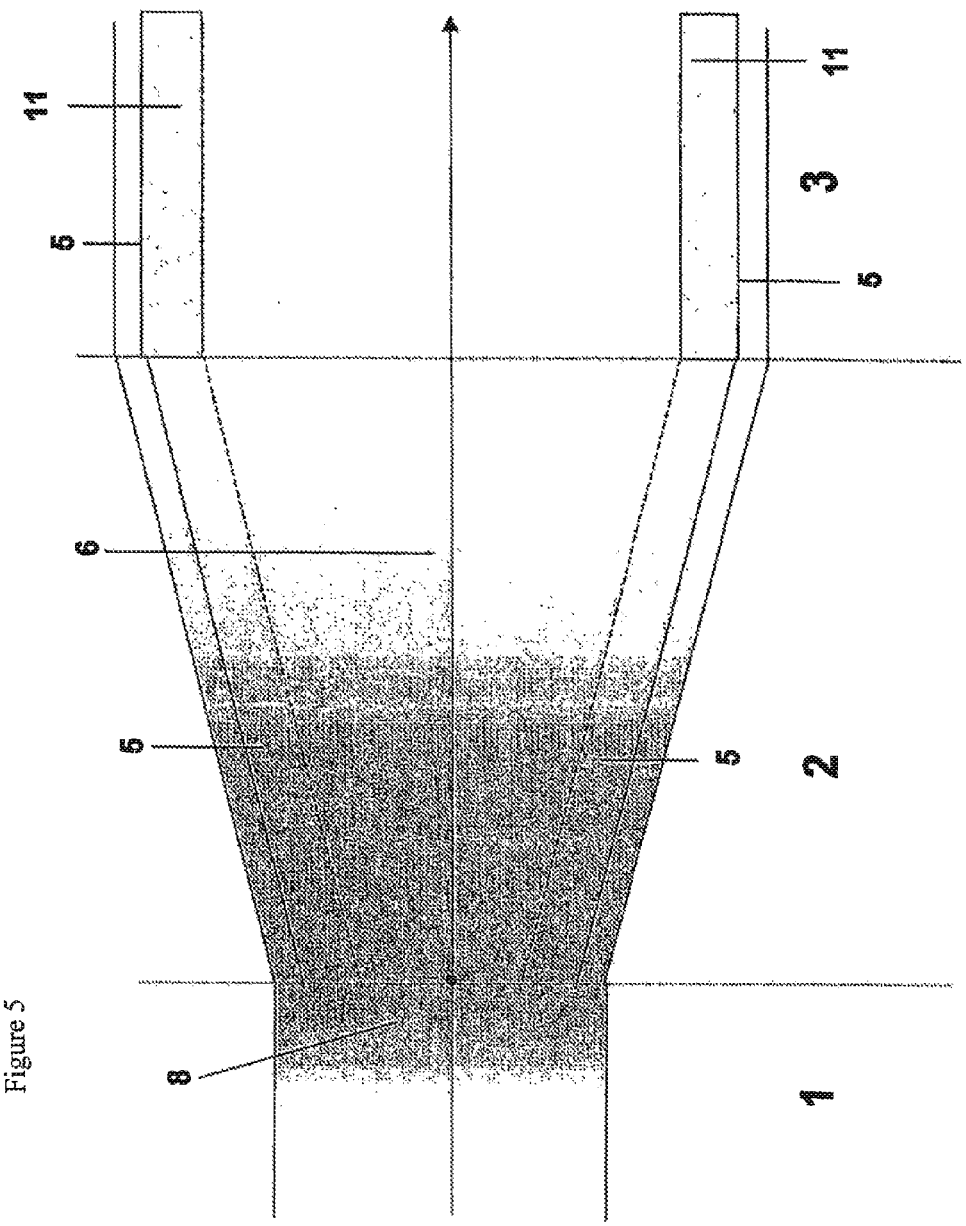
Figure 5A:
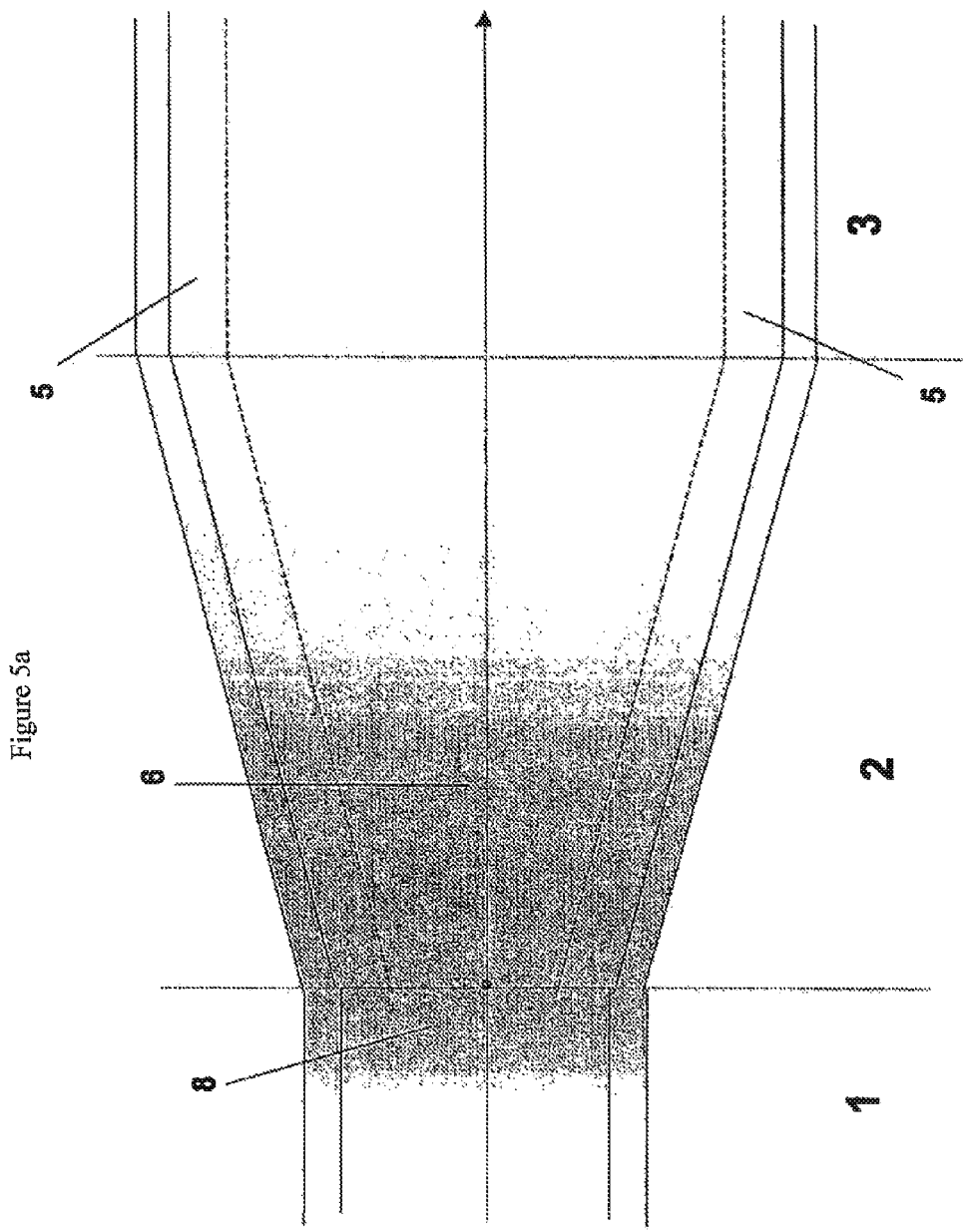

FIGS. 5 and 5a show a variant of transverse drawing according to the present invention. The boundary zones 5 within the fixing fields 3 are protected by means of suitable measures or devices such as, for example, cover plates 11, as a result of which cooling of the boundary zones 5 is prevented in the fixing area 3. As a result, the boundary zones 5 retain a higher temperature during fixing even though the film 8 is cooled when it passes through the fixing fields 3 (FIG. 5a).

Figure 6:
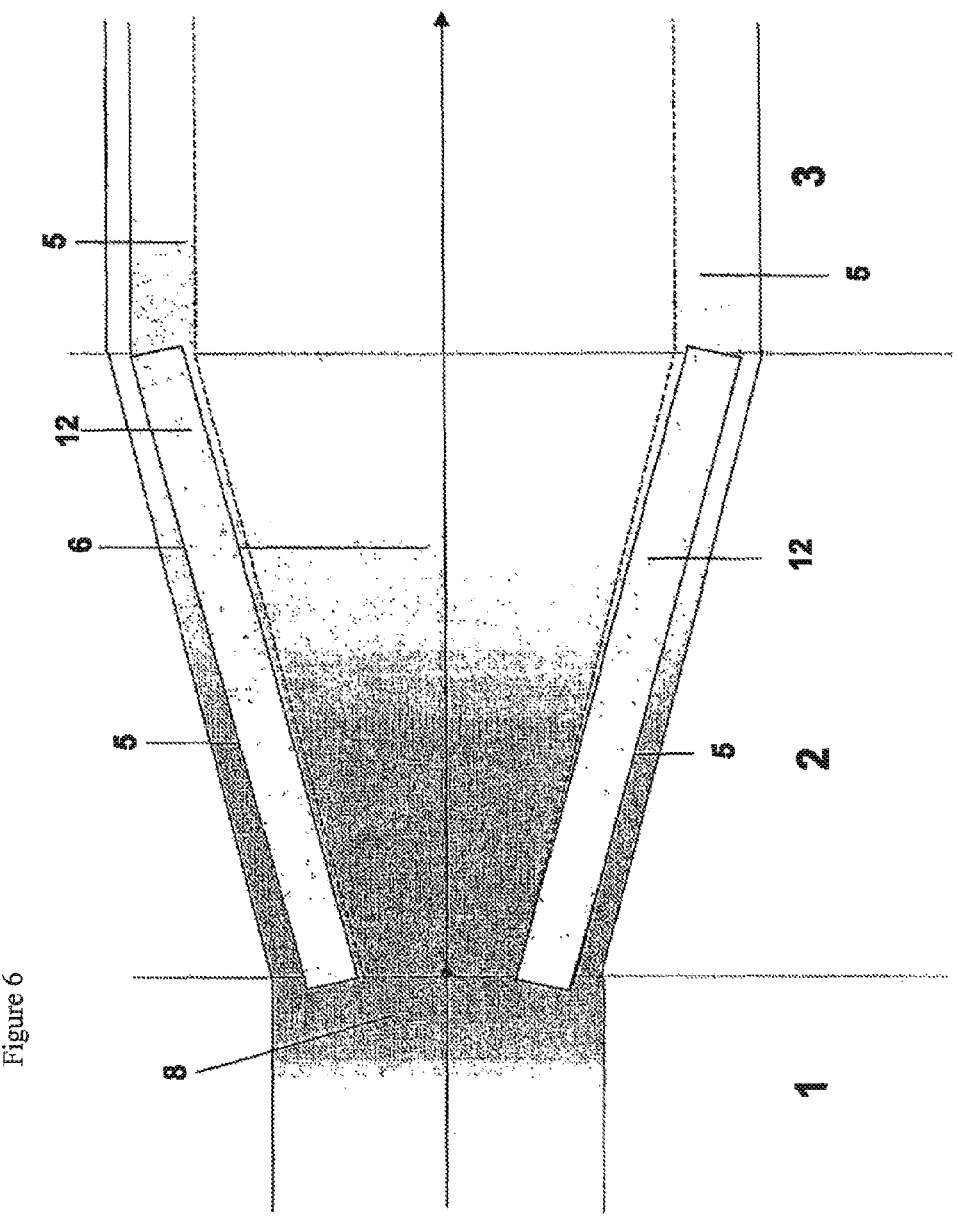
Figure 6A:
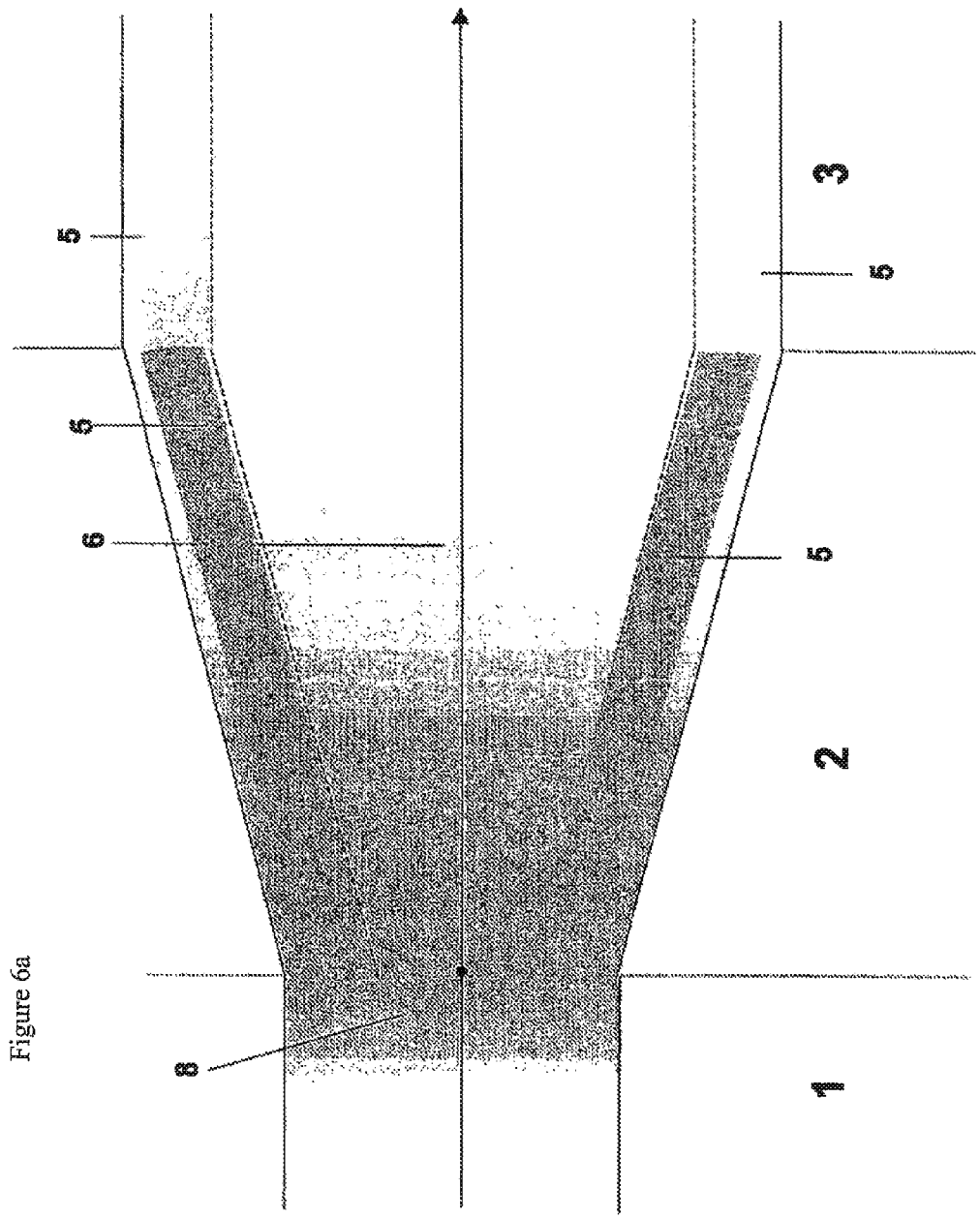

FIGS. 6 and 6a show an alternative variant of the method, in which a temperature profile is established over the width of the film in the area of the drawing fields 2. The boundary zones 5 within the drawing field 2 are protected by means of cover plates 12, as a result of which cooling of the boundary zones 5 is prevented in the area of the drawing field 2. As a result, the boundary zones 5 retain a higher temperature than the middle 6 of the film during transverse drawing even though the drawing field 2 has a reducing temperature profile in the longitudinal direction due to cooling. This temperature profile is shown in FIG. 6a in idealised form.

Figure 7:
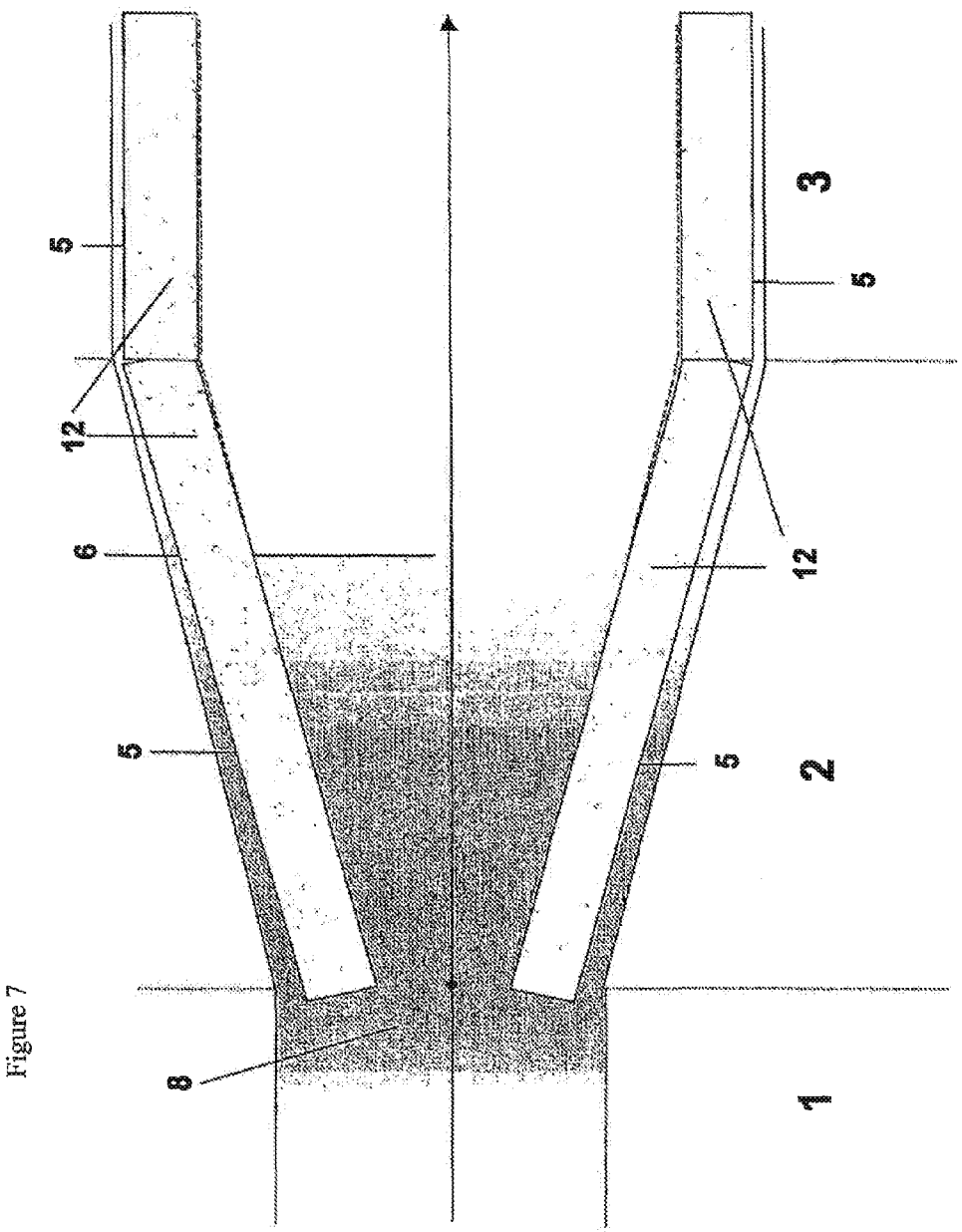
Figure 7A:
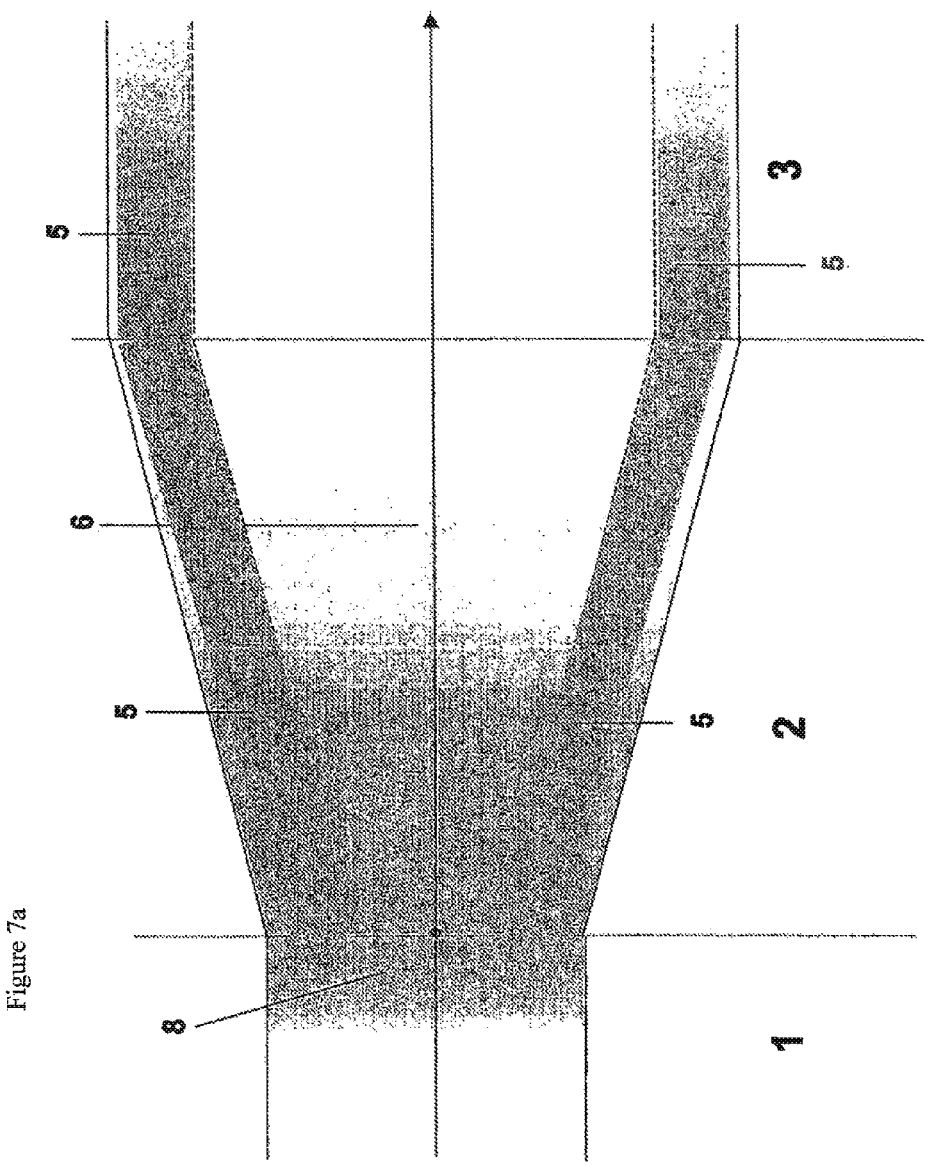

FIGS. 7 and 7a show a further variant of the method according to the invention. Here, the temperature is controlled in the drawing field 2 and in the fixing fields 3 by means of cover plates 12 so that the boundary zones 5 are warmer than the middle area of the film 6 both during transverse drawing and in the fixing area.

Figure 8:
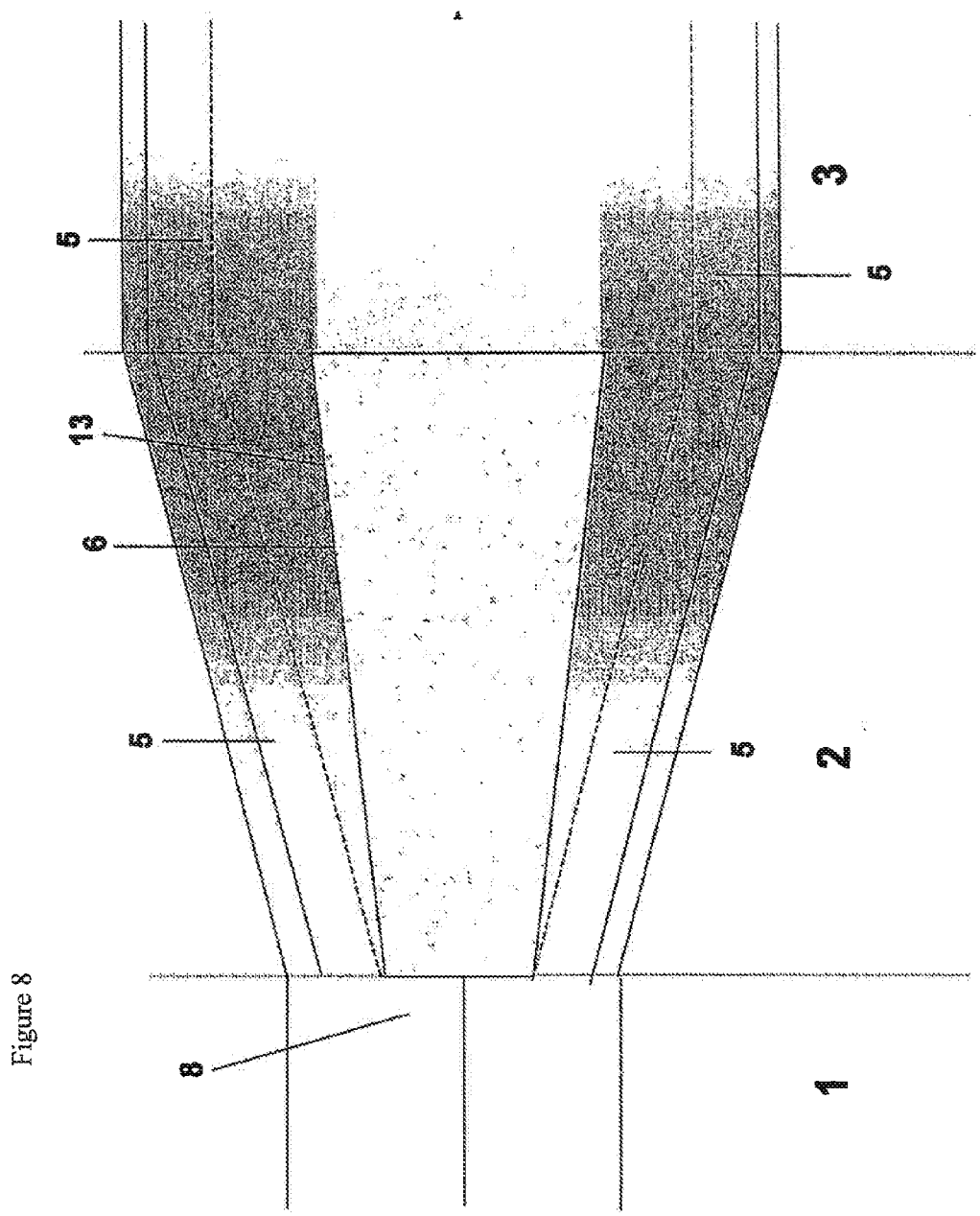

FIGS. 8 and 8a show a variant of the method according to the invention, in which a positive temperature gradient is established in the drawing field 2. Here, the middle area 6 of the film is insulated by means of a cover plate 13 so that the boundary zones 5 are warmer than the middle area of the film 6 during transverse drawing.

The method according to the invention is suitable for different sheet-like material webs, and can be advantageously used anywhere that a non-uniform characteristic profile, such as a transverse shrinkage profile, for example, is found over the width of the material web. In particular, the method has proved its worth for films whose layer or layers are made up of thermoplastic plastics, for example aliphatic or aromatic polyesters, polyolefines, such as polyethylenes or polypropylenes, cycloolefines, polycarbonate, polyamides etc. Films of this kind can be single-layer or multi-layer and contain identical or different polymers in the layers. The method is particularly suitable for material webs, which have a thickness of 2 to 2000 μm, preferably 10 to 1000 μm, after longitudinal drawing.

In general, transverse drawing according to the invention is carried out after longitudinal drawing. Should the situation arise, the advantages of the invention can also be used when an undrawn film is only transversely drawn according to the invention. Here, the undrawn material web likewise has a thickness of 2-2000 μm, preferably 10 to 1000 μm, before transverse drawing according to the invention.

In a method according to the invention, the longitudinally drawn or undrawn film web is heated to the necessary transverse drawing temperature $T_O$ by suitable measures. This area is also referred to as the heater field or heater fields (1). Heating is carried out, for example, by means of hot air, which comes from so-called nozzle boxes mounted below and above the material web. In general, the film web (8) is heated in the heater fields (1) in such a way that the film acquires or exhibits a uniform temperature over the width. When it enters the heater fields (1), the film (8) is gripped on both edges (4) by the clips (7) of a circulating clip chain. This edge (4) is usually narrow compared with the overall width of the web. It goes without saying that any endless material web has two edges (4), and the film is therefore gripped on both sides by the clips (7). The clips (7) guide the film (8) through the whole transverse drawing frame (1+2+3). Polypropylene films are generally heated to a temperature of up to 180°, preferably to a temperature of 140 to 170° C., in the heater fields.

After passing through the heater fields (1) the film (8) enters the drawing field (2). As a result of the divergent guiding of the clip chain, the film (8) is continuously drawn in the width on the way through the drawing field (2) until it has reached the intended width at the end. The temperature in the direction of travel can vary in the area of the drawing field (2), whereby a reducing temperature (negative temperature gradient) is preferred, but an increasing temperature (positive temperature gradient) is also possible. Alternatively, the temperature in the drawing field (2) can also been maintained as constant as possible (isothermal temperature control). For polypropylene films, the temperature in drawing fields lies in a range from 140 to 165° C.

After drawing in the drawing field (2), the film passes through the fixing zone (3). In this area, the film (8) is held at a constant width by means of the clips (7) and at a temperature, which is constant or reducing in the direction of travel, in order to fix the orientation achieved by transverse drawing. Depending on the required shrinkage characteristics, the fixing zone can also be run in converging mode, in order to partially dissipate the stresses introduced due to orientation. On leaving the fixing field (3), the clips (7) open and the film is transported onwards by means of rotating rollers, and at the same time cooled to room temperature and subsequently wound.

According to the method for transverse drawing according to the invention, in addition to controlling the temperature in the direction of film travel, a temperature profile is established over the width of the film (8) in such a way that both border zones (5) of the film (8) have a higher temperature than the middle of the film (6) in the area of the drawing field (2) and/or in the area of the fixing field (3). Surprisingly, a very uniform, i.e. constant, transverse shrinkage can be achieved over the width of the film by establishing such a temperature profile over the width.

In the sense of the present invention, the "edges" (4), which are gripped by the clips (7), must be differentiated from the film edges (5) of the trimmed film (in the sense of the present invention referred to as "boundary zones" (5)). The edges (4), which the clips (7) grip, remain undrawn, are trimmed after manufacture, and are fed back into the film manufacturing process as recycled granulate. Depending on the design of the clips (7), the width of these edges on both sides is approximately 5 to 15 cm, preferably 7 to 10 cm, measured from the outside edge.

Depending on the film width, the width of the boundary zones (5) on each side of the drawn film, which according to the state of the art have higher transverse shrinkage values than the middle area of the film (6), are approximately 5 to 25%, preferably 8 to 20% of the web width. For example, in the case of biaxially drawn polypropylene films with the usual web widths of trimmed, biaxially drawn final film of 5 to 10 m, each boundary zone is approximately 50 to 200 cm wide. The additional heating or insulation according to the invention takes place over the width of these boundary zones (5).

Depending on the type of film or manufacturing machine, the above-mentioned sizing of the edges (4) and boundary zones (5) can deviate from these values to a greater or lesser extent. In general, the heating of the boundary zones (5) will be extended over the width to such an extent that areas with increased transverse shrinkage extensively disappear, so that the film has roughly equal transverse shrinkage values over the whole width, i.e. variations from the transverse shrinkage in the middle area of the film (6) should be as small as possible.

The causes of the effects achieved are not fully scientifically understood, the applicability of the teaching according to the invention being in no way restricted by this however. Polymers are long-chain molecules, which are present in the melt and after cooling without orientation and tangled together. Due to the effect of drawing forces, these chains of molecules align themselves in the direction of the acting forces, i.e. they are oriented in a certain direction. On the one hand, this alignment assumes a certain ability of the molecule chains to move, and invasive forces, which act on the polymer chains. When transverse drawing, the ability of the polymer chains to move must be a great enough due to an increased temperature to enable the polymer chains, which are already aligned in the longitudinal direction, to be reoriented in the transverse direction.

The effects of the invasive drawing forces depend both on the ability of the molecule chains to move at this instant in time and on the temperature experience, which the polymer chains undergo after alignment due to the drawing forces. By reducing the temperature in the fixing field when orientation is complete, the oriented state is frozen to a certain extent; by maintaining an increased temperature when fixing, the ability of the polymer chains to move leads partially to a relaxation of the ordered, oriented state. The above comments make it clear that, basically, the result of biaxial drawing depends essentially on the temperatures, which the film experiences before, during and after drawing.

When transverse drawing, the orientation begins from the middle of the film and moves further and further outwards with increasing travel of the film through the drawing field (2) until it reaches the border zones (5). From a timing point of view, the border zones (5) of the film (8) therefore experience drawing at a later time (from a spatial point of view, not until the end of the drawing field) than the middle area (6) of the film (8). As a result of the normal temperature profile in the drawing field (2), i.e. reducing temperature in the direction of travel of the film (8), according to the state of the art, drawing of the boundary zones (5) therefore occurs at a lower temperature ($<T_Q$) than the drawing of the middle area ($\sim T_Q$). Added to this is the fact that the polymer chains in the middle of the web have a different temperature-time experience after drawing. The middle (6) of the film (8), already drawn, passes through the whole area of the drawing field (2), whereas the boundary zones (5) only arrive at the end of the drawing field (2) immediately after drawing and enter the cooler fixing field (3).

The method according to the invention matches these different temperature-time experiences, which the different areas of the film (8) undergo according to the state of the art. In addition, the heating or insulation of the border zones (5) in the drawing fields and/or in the fixing field (3) contributes to the fact that the border zones (5), which are drawn late, are also subjected to a higher temperature for a certain time after drawing and therefore undergo a similar temperature-time experience to the middle area (6) of the film (8).

In a preferred embodiment of the method, the film (8) in the fixing fields (3), i.e. after leaving the drawing field (2), is tempered by means of additional heating or insulating elements above the border zones (5) or other suitable measures so that the film web (8) has a lower temperature in the middle (6) than in the area of the border zones (5) during fixing (3) and the border zones (5) have an increased temperature. Depending on the type of thermoplastic polymers, a temperature profile will be adequate in which the temperatures in the border zones (5) lie approximately 1 to 20 Kelvin, preferably 3 to 15 Kelvin, higher than in the middle of the web (6).

This temperature profile can be realised by various means. In general, thermal insulation in the border zones (5) is preferred so that the film web has a higher temperature towards the boundary zones (5) than in the middle of the web (6). In the simplest case, thermally insulating cover plates (11) can be fitted above and/or below the boundary zones (5). These are positioned so that the air current, which flows through the fixing field (3) and cools the film (8) to the required temperature, is guided away over the cover plates (11), so that a cooling of the film (8) is avoided. Alternatively or in addition, heating elements are also possible, which radiate heat and are positioned above and/or below the boundary zones (5). Examples of suitable heating elements are IR radiators and gas heaters.

In the individual case, the person skilled in the art will act in accordance with the structural circumstances of the fixing field and the system as well as in accordance with the type of film to be manufactured, and decide exactly how and where additional heaters or insulation are to be fitted. The particular embodiment can take different forms. The main element, however, is common to all embodiments; In a frame, which cools down in the direction of travel, the boundary zones (5) in the fixing field (3) must experience additional heating or conversely be protected by insulating measures from too severe cooling. As a result of this, the drawn boundary zones (5) are fed through the fixing field (3) at increased temperature (compared with the middle (6)), and all drawn areas are subjected to an increased temperature immediately after drawing, including the areas, which enter the fixing field (3) at the end of the drawing frame (2) immediately after drawing. This enables all drawn zones to undergo a temperature-time experience, which is as similar as possible.

Surprisingly, the undesirable non-uniform shrinkage profile can be considerably improved when the boundary zones (5) of the film (8) are heated or cooled down less in the fixing fields (3) than in the middle area (6).

The specific temperatures or the temperature profile in the longitudinal and transverse direction depend on the type of film and the film thickness as well as the design of the film manufacturing system and the fixing field.

The remaining method conditions are chosen so that the film has the required shrinkage characteristics. These relationships are fundamentally known. According to the method according to the invention, films can therefore be manufactured which have a transverse shrinkage from 1 to 25%, preferably 3 to 20%, whereby these shrinkage values do not vary over the width of the film by more than ±5%, preferably ±0.5 to ±3%, of the shrinkage in the middle area (6).

In a further embodiment of the invention, in order to equalise the shrinkage profile, a special temperature control can be carried out in the drawing fields (2), which can be supplemented in the fixing field (3) by the measures described above if necessary. According to this variant of the method, the film (8) in the drawing field (2) is tempered by means of additional heating or insulating elements (12) above the border zones (5) so that a temperature profile is already established over the width of the film web in the drawing field (2), i.e. the film web has a lower temperature in the middle (6) than in the area of the border zones (5) when it travels through the drawing fields (2). Here too, the exact temperature profile depends on the type of thermoplastic polymers; a temperature gradient of approximately 1 to 20 Kelvin, 3-15 Kelvin, is preferred, i.e. the temperature in the boundary zones (5) is less than in the middle of the web (6) by this amount. Ideally, when the drawing forces act in the boundary zones (5), the temperature the web (6) so that each area over the whole width of the film (8) is drawn at film temperatures, which are as similar as possible, and the boundary zones (5), which are drawn later, are also subjected to an increased temperature after drawing so that all areas of the film (8) (viewed over the width of the film) undergo a drawing and temperature experience, which is as similar as possible.

If necessary, the uniform development of shrinkage can be further improved by combining both variants of the method. In the case of a negative temperature gradient in the drawing field (2), the boundary zones (5) both in the area of the drawing field (2) and in the fixing area (3) are then heated or insulated by means of the measures described above so that the boundary zones (5) have a higher temperature than the middle both in the drawing field (2) and in the fixing field.

An outstanding transverse shrinkage profile is achieved when a polypropylene film is transverse drawn using the method according to the invention. The method is therefore particularly suitable for the transverse drawing of polypropylene films. The following table summarises by way of example the conditions for the drawing of a film, which is made up predominantly from isotactic polypropylene:

|  | Temperature of middle of web $T_B$ | Temperature of boundary zones $T_R$ |  | Width of boundary zones (5) | Web width of trimmed final film |
|---|---|---|---|---|---|
| Drawing fields | 130-160° C. | From $T_B + 2$ K to $T_B + 12$ K | Draw factor 5-10 | 50-200 cm | 4-10 m |
| Fixing | 30-140° C. | From $T_B + 2$ K to $T_B + 30$ K | Convergence 1-20% |  |  |
| Drawing fields preferably | 135-155° C. | From $T_B + 3$ K to $T_B + 8$ K | Draw factor 7.5-10 | 50-150 cm | 7-10 m |
| Fixing preferably | 40-120° C. | From $T_B + 2$ K to $T_B + 20$ K | 5-15% |  |  | should be roughly the same as that, which the film (8) has when it enters the frame ($T_Q$). Surprisingly, a very uniform, i.e. constant, transverse shrinkage can also be achieved over the width of the film (8) by establishing such a temperature profile in the drawing field (2).

Additional heating of the boundary zones (5) can be carried out, for example by means of additional heating elements, which radiate heat and are positioned above the boundary zones (5) to be heated. Examples of suitable heating elements are IR radiators and gas heaters. In the case of temperature control in the drawing field (2) with negative temperature gradients in the direction of travel, thermally insulating cover plates can be fitted above and/or below the boundary zones (5). These are positioned so that the air, which tempers the drawing field and the film, flows away over the cover plates so that a cooling of the boundary zones by the exchange of air is avoided. In the case of an inverse temperature control in the drawing field, i.e. for a positive temperature gradient, cover plates (13) can be fitted in the middle area (6) of the film (8), which likewise result in higher temperatures being achieved in the boundary zones (5).

In the individual case, the person skilled in the art will act in accordance with the structural circumstances of the drawing field (2) and the system as well as in accordance with the type of film to be manufactured, and decide how and where additional heaters or insulation are to be fitted. The particular embodiment can take different forms. The main element, however, is common to all embodiments: By means of additional heating or protection against cooling, the boundary zones (5) must have a higher temperature than the middle of The following measuring methods were used to characterise the raw materials and films.

Shrinkage:

The longitudinal and transverse shrinkage values relate to the respective elongation of the film (longitudinal $L_0$ and transverse $Q_0$) before the shrinking process. The longitudinal direction is the machine direction; the direction perpendicular to the machine running direction is accordingly defined as the transverse direction. The 10 cm*10 cm film sample was shrunk in the circulating air oven at 130° C. for a duration of 5 min. The remaining elongation of the sample in the longitudinal and transverse direction was then determined once more ($L_1$ and $Q_1$). The shrinkage in % is then given by the ratio of the difference in the determined lengths to the original length $L_0$ and $Q_0$.

$$\text{Longitudinal shrinkage } L_S \ [\%] = \frac{L_0 - L_1}{L_0} * 100 [\%]$$

$$\text{Transverse shrinkage } Q_S \ [\%] = \frac{Q_0 - Q_1}{Q_0} * 100 [\%]$$

This method of determination for the longitudinal and transverse shrinkage is in accordance with DIN 40634.

The invention is now explained with reference to the following exemplary embodiments:

EXAMPLE 1

A transparent, triple-layer film having symmetrical structure with a total thickness of 20 μm is manufactured by coextrusion and subsequent stepwise orientation in the longitudinal and transverse direction. The facing layers each had a thickness of 0.8 μm.

| A-Base layer: | |
|---|---|
| 89.85 wt. % | Highly isotactic propylene homopolymer with a melting point of 166° C. and a melt flow index of 3.4 g/10 min, wherein the n-heptane insoluble fraction had a chain isotactic index of 98%. |
| 10.0 wt. % | Hydrocarbon resin, softening point 120°, with a mean molecular weight Mw of 1000. |
| 0.15 wt. % | N,N-bis-ethoxyalkylamine (antistatic agent) |
| B-Facing layers: | |
| ca. 75 wt. % | Statistical ethylene-propylene copolymer with a $C_2$ content of 4.5 wt. % |
| ca. 25 wt. % | Statistical ethylene-propylene-butylene terpolymer with an ethylene content of 3 wt. % and a butylene content of 7 wt. % (rest propylene) |
| 0.33 wt. % | $SiO_2$ as anti-blocking medium with a mean particle size of 2 μm |
| 0.90 wt. % | Polydimethylsiloxane with a viscosity of 30 000 mm²/s |

The manufacturing conditions in the individual method steps were:

| Extrusion: | Temperatures | Base layer: | 260° C. |
|---|---|---|---|
| | | Facing layers: | 240° C. |
| | Temperature of take-off roll | | 30° C. |
| Longitudinal draw: | Temperature: | | 110° C. |
| | Longitudinal draw ratio: | | 5.5 |
| Transverse draw: | Temperature: (negative gradient) | | 150-140° C. |
| | Transverse draw ratio: | | 9 |
| Fixing: | Temperature: | | 60-120° C. |
| | Convergence: | | 8% |

The transverse draw ratio of 9 is an effective value. This effective value is calculated from the final film width B reduced by twice the trimmed strip width b (edges 4), divided by the width of the longitudinally drawn film, likewise reduced by twice the trimmed strip width b (edges 4).

According to the invention, the boundary zones in the fixing area were protected against the cooling air current by means of cover plates so that the temperature here was approximately 25° C. higher than the temperature in the middle of the web. The width of the cover plates was approximately 1 m. The trimmed final film had a width of 700 cm. The transverse shrinkage of the film was measured in the middle area and in the boundary zones. In the middle, the transverse shrinkage was an average of 13±0.5%, and in the two boundary zones an average of 15.5±0.9% Δ 1.5%).

EXAMPLE 2

A film was manufactured with the same composition as described in Example 1. The method conditions were likewise the same as those in Example 1. Unlike Example 1, IR radiators were fined in the drawing fields in the area of the boundary zones so that the boundary zones had an increased temperature compared with the middle of the film when the film was drawn. The temperature was approximately 6° C. higher. The transverse shrinkage of the film was likewise measured in the middle area and in the boundary zones. In the middle, the transverse shrinkage was an average of 13±0.5%, and in the two boundary zones an average of 13.5±0.5% Δ 0.5%).

COMPARATIVE EXAMPLE

A film was manufactured with the same composition as described in Example 1. The method conditions were not changed. Unlike Example 1, no special measures were taken to establish a temperature profile over the width of the film. Cover plates and IR radiators were not fitted either in the area of the drawing fields or in the fixing field. The transverse shrinkage of the film was measured in the middle area and in the boundary zones. In the middle, the transverse shrinkage was an average of 13±0.5%, and in the two boundary zones an average of 18±1.5% Δ 5%).

The invention claimed is:

1. A method for the transverse drawing in a sequential biaxial stretching process of a longitudinally oriented film web made from thermoplastic plastic, in which a longitudinally drawn film (6) is introduced into a transverse drawing frame, wherein the transverse drawing frame includes heater fields (1), drawing fields (2) and fixing fields (3), and the film (8) is gripped at the beginning of the first heater field on both edges (4) by the clips (7) of a clip chain and heated in the heater fields (1) to a transverse drawing temperature $T_Q$, and the film (8) is drawn in the subsequent drawing fields (2) by divergent (V-shaped) guiding of the clip chain in the transverse direction and subjected to a temperature $T_F$ in the fixing fields (3) where $T_Q>T_F$, wherein the boundary zones (5) of the film (8) are heated or thermally insulated in the drawing fields (2) and/or in the fixing fields (3) in such a way that the boundary zones (5) of the film (8) have a higher temperature than the middle of the film web (6) on transverse drawing and/or fixing (4).

2. The method of claim 1, wherein the thermoplastic plastic is a polyester, polyethylene, polycarbonate, polypropylene, polyamide or a cycloolefine polymer.

3. The method of claim 1, wherein the boundary zones (5) in that the drawing fields (2) have a higher temperature than the middle of the film web.

4. The method of claim 1, wherein the boundary zones (5) in the fixing fields (3) have a higher temperature than the middle of the film web (6).

5. The method of claim 1, wherein the boundary zones (5) in the drawing fields (2) and in the fixing fields (3) have a higher temperature than the middle of the film web (6).

6. The method of claim 1, wherein in the area of the drawing fields (2) the temperature of the boundary zones (5) lies 1 to 20 Kelvin above the temperature of the middle area of the film web (6).

7. The method of claim 1, wherein in the area of the fixing fields (3) the temperature of the boundary zones (5) lies 1 to 20 Kelvin above the temperature of the middle area of the film web (6).

8. The method of claim 1, wherein the undrawn or longitudinally drawn film web (8) has a thickness of 2 to 2000 μm.

9. The method of claim 1, wherein each boundary zone (5) makes up 5 to 25% of the web width of the biaxially drawn trimmed film web (8).

10. The method of claim 1, wherein the film web (8) is a longitudinally drawn polypropylene film.

11. The method of claim 10, wherein the polypropylene film has a web width of 5 to 10 m and each boundary zone (5) is 50 to 200 cm wide after transverse drawing and after trimming of the undrawn edges.

12. The method of claim 1, wherein additional heating elements are fitted above the two boundary zones (5) in the drawing fields (2) and/or fixing fields (3).

13. The method of claim 1, wherein additional thermally insulating cover plates (11) are fitted above the two boundary zones (5) in the area of the fixing fields (3).

14. The method of claim 1, wherein in the area of the drawing fields (2) the temperature reduces in the direction of travel of the film (8), and that thermally insulating cover plates (12) are fitted above the two boundary zones (5).

15. The method of claim 1, wherein in the area of the drawing fields (2) the temperature increases in the direction of travel of the film (8), and that thermally insulating cover plates are fitted above the middle area of the film web (6).

16. The method of claim 1, wherein the film (8) is transversely drawn by a factor of 2 to 12.

17. The method of claim 1, wherein the film (8) is a polypropylene film and is transversely drawn by a factor of 5 to 12.

18. The method of claim 1, wherein the film has a transverse shrinkage of 3-25%.

19. The method of claim 1, wherein the film has a transverse shrinkage of 3-25% and that the shrinkage values over the width of the film web do not deviate from the shrinkage value in the middle area of the film by more than ±5%.

20. A method for manufacturing a film with a transverse shrinkage of 3 to 25%, wherein the film has been drawn in the transverse direction using the method of claim 1.

21. A method for transverse drawing in a monoaxially-only or a sequential biaxial stretching process of an unoriented or longitudinally oriented film web made from thermoplastic plastic, comprising:

introducing an undrawn or longitudinally drawn film (6) into a transverse drawing frame;

gripping the film at the beginning of a first heater field on both edges (4) using clips on a clip chain;

heating the undrawn or longitudinally drawn film to a transverse drawing temperature TQ;

drawing the heated film in by divergent (V-shaped) guiding of the clip chain in the transverse direction;

fixing the drawn film by subjecting the drawn film to a temperature TF wherein TQ>TF; and thermally insulating boundary zones (5) of the film (8) during drawing and/or fixing in such a way that the boundary zones (5) of the film (8) have a higher temperature than the middle of the film web (6) during the transverse drawing and/or the fixing.

22. The method of claim 21 wherein the transverse drawing frame includes heater fields (1), drawing fields (2) and fixing fields (3), and the film (8) is gripped at the beginning of the first heater field on both edges (4) by the clips (7) of the clip chain and heated in the heater fields.

23. The method of claim 21, wherein the film has a transverse shrinkage of 3-25%.

24. The method of claim 21, wherein transverse shrinkage values over the width of the film web do not deviate from a transverse shrinkage value in the middle area of the film by more than ±5%.

\* \* \* \* \*